United States Patent
Han et al.

(10) Patent No.: US 9,747,018 B2
(45) Date of Patent: Aug. 29, 2017

(54) APPARATUS AND METHOD FOR CONTROLLING OBJECT

(75) Inventors: Seung Ju Han, Seoul (KR); Joon Ah Park, Seoul (KR); Hyung Kew Lee, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 578 days.

(21) Appl. No.: 13/137,875

(22) Filed: Sep. 20, 2011

(65) Prior Publication Data

US 2012/0133585 A1   May 31, 2012

(30) Foreign Application Priority Data

Nov. 30, 2010   (KR) .......................... 10-2010-0120574

(51) Int. Cl.

| G06F 3/033 | (2013.01) |
|---|---|
| G06F 3/0488 | (2013.01) |
| G06F 3/01 | (2006.01) |
| G06F 3/044 | (2006.01) |

(52) U.S. Cl.
CPC ............ G06F 3/0488 (2013.01); G06F 3/017 (2013.01); *G06F 3/044* (2013.01); *G06F 2203/04101* (2013.01)

(58) Field of Classification Search
CPC ........... G06F 2203/04101; G06F 3/017; G06F 3/044; G06F 3/0488
USPC .......................... 345/158, 170–176; 382/124
See application file for complete search history.

(56) References Cited

U.S. PATENT DOCUMENTS

| 5,848,176 | A | * | 12/1998 | Hara | G06K 9/00067 382/124 |
|---|---|---|---|---|---|
| 2008/0005703 | A1 | * | 1/2008 | Radivojevic et al. | 715/863 |
| 2008/0273755 | A1 | * | 11/2008 | Hildreth | 382/103 |
| 2009/0201261 | A1 | * | 8/2009 | Day | 345/173 |
| 2009/0239588 | A1 | * | 9/2009 | Nam | 455/566 |
| 2010/0004028 | A1 | * | 1/2010 | Park et al. | 455/566 |
| 2010/0004029 | A1 | * | 1/2010 | Kim | 455/566 |
| 2010/0026664 | A1 | * | 2/2010 | Geaghan | 345/174 |
| 2010/0073321 | A1 | * | 3/2010 | Tseng et al. | 345/174 |
| 2010/0257491 | A1 | * | 10/2010 | Geurts et al. | 715/863 |

(Continued)

FOREIGN PATENT DOCUMENTS

| JP | 2006-236143 | 9/2006 |
|---|---|---|
| KR | 10-2009-0029816 A | 3/2009 |

(Continued)

OTHER PUBLICATIONS

Korean Office Action issued on Jan. 15, 2016 in counterpart Korean Application No. 10-2010-0120574. (8 pages in Korean with English Translation).

*Primary Examiner* — Tony Davis
(74) *Attorney, Agent, or Firm* — NSIP Law (57) ABSTRACT

An apparatus and method for controlling an object are provided. Motions of fingers present in a 3-dimensional (3D) sensing area are detected, and a pointer or an object being displayed is controlled corresponding to the detected motions. Therefore, input of a control signal may be achieved without a direct touch on a display device such as a terminal, thereby preventing leaving marks on a screen of the display. In addition, since the motions of fingers are detected within the 3D sensing area, not on a 2-dimensional (2D) plane, more types of input motions may be used.

10 Claims, 10 Drawing Sheets

(56) References Cited

U.S. PATENT DOCUMENTS

| | | | |
|---|---|---|---|
| 2011/0074675 A1* | 3/2011 | Shiming | G06F 3/017 345/158 |
| 2011/0102351 A1* | 5/2011 | Seo | 345/173 |
| 2012/0110662 A1* | 5/2012 | Brosnan | 726/19 |
| 2012/0112767 A1* | 5/2012 | Nonogaki | 324/633 |
| 2012/0309516 A1* | 12/2012 | Langridge | G06K 9/00355 463/31 |

FOREIGN PATENT DOCUMENTS

| | | |
|---|---|---|
| KR | 10-2009-0104469 | 10/2009 |
| KR | 10-2009-0105160 | 10/2009 |
| KR | 10-2009-0116663 | 11/2009 |
| KR | 10-2010-0001601 | 1/2010 |
| KR | 10-2010-0002776 | 1/2010 |
| KR | 10-2010-0041006 | 4/2010 |

* cited by examiner

APPARATUS AND METHOD FOR CONTROLLING OBJECT

CROSS-REFERENCE TO RELATED APPLICATIONS

This application claims the benefit of Korean Patent Application No. 10-2010-0120574, filed on Nov. 30, 2010, in the Korean Intellectual Property Office, the disclosure of which is incorporated herein by reference.

BACKGROUND

1. Field

One or more example embodiments of the following description relate to an apparatus and method for controlling an object by detecting motions of a finger of a user.

2. Description of the Related Art

Recently, a touch input method is commonly used in various devices such as a mobile terminal, a desk-top computer, and the like, to input a signal by touching a display surface of the devices.

In other words, a user is able to input a desired control signal to control a pointer or an object displayed by the device, by directly touching the display surface of the device without using a designated input unit.

However, the touch input method performed by directly touching a 2-dimensional (2D) plane, such as the display surface, may leave marks such as fingerprints on the display surface. Furthermore, depending on touch recognition capabilities, touch using designated tools such as a glove or a touch pen may not be recognizable.

SUMMARY

The foregoing and/or other aspects are achieved by providing an apparatus for controlling an object, including a sensing module to detect a position of at least one finger of a user, the at least one finger present in a 3-dimensional (3D) sensing area, and a number of the at least one finger present in the 3D sensing area; and a control module to generate motion information regarding motions of the at least one finger based on the position and the number of the at least one finger, and to control at least one of a pointer and an object based on the motion information.

The foregoing and/or other aspects are achieved by providing a method of controlling an object, including detecting a position of at least one finger of a user, the at least one finger present in a 3-dimensional (3D) sensing area, and a number of the at least one finger present in the 3D sensing area; generating motion information regarding motion of the at least one finger based on the position and the number of the at least one finger; and controlling at least one of a pointer and an object based on the motion information.

The foregoing and/or other aspects are achieved by providing a device having a display with a display surface. The device includes a sensing module to detect motion of at least one finger present in a 3-dimensional (3D) sensing area occupying a predetermined volume above the display surface and a control module to control an object displayed on the display based on the detected motion information.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout. Example embodiments are described below to explain the present disclosure by referring to the figures.

Figure 1:
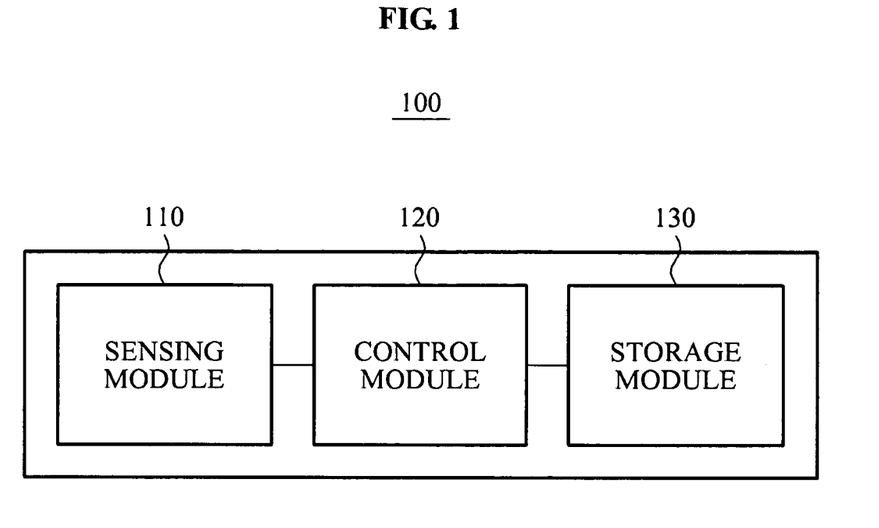
FIG. 1 illustrates a diagram of an object control apparatus according to example embodiments.

FIG. 1 illustrates a diagram of an object control apparatus 100 according to example embodiments.

Referring to FIG. 1, the object control apparatus 100 may include, for example, a sensing module 110, a control module 120, and a storage module 130.

The object control apparatus 100 may detect information on a position and a number of at least one finger of a user when the at least one finger is present in a 3-dimensional (3D) area. For example, in an embodiment, the object control apparatus 100 may detect information on the position of the at least one finger and a quantity of fingers present in the 3D area. The object control apparatus 100 may analyze motions of the at least one finger from the detected information and control a pointer or an object based on the analysis result. The pointer or the object may be items displayed on an electronic display such as a mobile terminal, a computer, and the like.

Here, the 3D sensing area having a predetermined size lies around a sensor or a sensing module capable of detecting the position and the number of the at least one finger of the user. Hereinafter, the 3D sensing area according to example embodiments will be described in detail with reference to FIG. 2.

Figure 2:
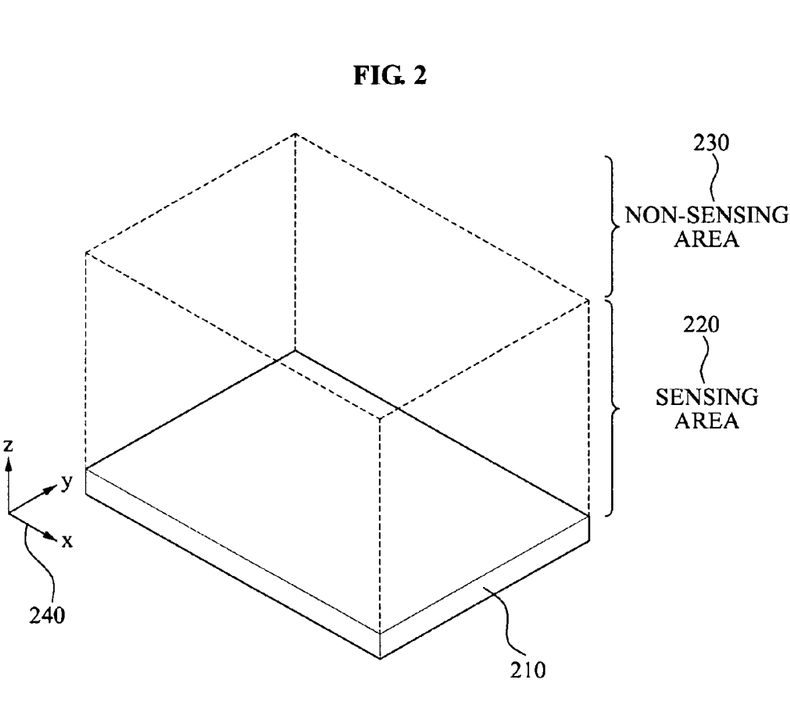
FIG. 2 illustrates a diagram of a 3-dimensional (3D) sensing area according to example embodiments.

FIG. 2 illustrates a diagram of a 3-dimensional (3D) sensing area 220 according to example embodiments.

Referring to FIG. 2, the 3D sensing area 220 may have a predetermined size and may be disposed relatively close to a sensing panel 210 included in the sensing module.

The 3D sensing area 220 may cover a volume up to a predetermined height from the sensing panel 210. The 3D sensing area 220 may be located directly above the sensing panel 210. Accordingly, a volume beyond the predetermined height may be referred to as a non-sensing area 230.

The object control apparatus may express the position of the at least one finger in the 3D sensing area using a 3D coordinate 240.

An x-axis and a y-axis of the 3D coordinate 240 may be set to correspond to a horizontal axis and a vertical axis of one side surface of the sensing panel 210. Also, a z-axis of the 3D coordinate 240 may correspond to a direction perpendicular to the one side surface of the sensing panel 210.

The sensing panel 210 may include upper electrodes and lower electrodes arranged in the form of a grid. For example, the upper electrodes may be disposed in an upper portion of the sensing panel 210, in the form of a grid, and the lower electrodes may be disposed in a lower portion of the sensing panel 210, in the form of a grid. The sensing panel 210 may detect the position and the number of the at least one finger present in the 3D sensing area 220, through variation of current intensity of an electric field generated between the upper electrodes and the lower electrodes.

Referring back to FIG. 1, the sensing module 110 detects the position of the at least one finger of the user, which is present in the 3D sensing area, and the number of the at least one finger present in the 3D sensing area.

According to the embodiments, the sensing module 110 may include an ultrasonic sensor, a capacitive touch sensor, an image sensor, and the like to detect the position and the number of the at least one finger in the 3D sensing area.

Information on the position of the at least one finger may include a distance between the sensing panel and the at least one finger, and a planar coordinate value of the at least one finger on the sensing panel.

Depending on embodiments, the distance between the sensing panel and the at least one finger may be expressed by a z-axis value of the 3D coordinate shown in FIG. 2.

The planar coordinate value of the at least one finger on the sensing panel may be expressed by an x-axis value and a y-axis value of the 3D coordinate of FIG. 2.

The control module 120 may generate motion information regarding motions of the at least one finger, based on the position and the number of the at least one finger.

Here, the motions may include a motion of a finger moving up and down in the 3D sensing area, a motion of two fingers moving downward while being separated from each other, a motion of two fingers moving upward while being closed together, a motion of two fingers rotating clockwise or counterclockwise at a predetermined interval about a predetermined rotational axis, and the like.

The control module 120 may control at least one of the pointer and the object based on the motion information.

The object control apparatus may further include the storage module 130.

The storage module 130 may store a table that contains the motions and execution operations corresponding to the motions. The stored execution operations relate to at least one of the pointer and the object.

The control module 120 may process the execution operations corresponding to the motion information, by referring to the table.

For example, a motion of the at least one finger moving toward the sensing panel, that is, in a downward direction, at a higher speed than a predetermined speed and by a longer distance than a predetermined distance may correspond to an execution operation of selecting the object pointed to by the pointer. The motion may be included in the table and may be stored in the storage module 130.

Here, the control module 120 may select the object pointed to by the pointer when the at least one finger moves toward the sensing panel at a speed that is higher than the predetermined speed and by a distance that is longer than the predetermined distance.

Also, in the table, a motion of the at least one finger moving away from the sensing panel, that is, in an upward direction, at a higher speed than the predetermined speed and by a longer distance than the predetermined distance may correspond to an execution operation of cancelling the selection of the object pointed to by the pointer.

Here, the control module 120 may cancel the selection of the object when the at least one finger moves away from the sensing panel at the speed higher than the predetermined speed and by the distance that is longer than the predetermined distance.

Also, a motion of the at least one finger moving toward the sensing panel, that is, in the downward direction, either at a lower speed than the predetermined speed or by a shorter distance than the predetermined distance may correspond to an execution operation of enlargement, to a first size, a pointing area corresponding to the pointer. The motion may be included in the table and may be stored in the storage module 130.

In this case, the control module 120 may enlarge the pointing area corresponding to the pointer to the first size when the at least one finger moves either at the speed lower than the predetermined speed or by the distance shorter than the predetermined distance.

Also, a motion of the at least one finger moving away from the sensing panel, that is, in the upward direction, either at the speed lower than the predetermined speed or by the distance shorter than the predetermined distance may correspond to an execution operation of enlargement, to a second size, the pointing area corresponding to the pointer. Depending on embodiments, the second size may be set smaller than the first size. The motion may be included in the table and may be stored in the storage module 130.

In this case, the control module 120 may enlarge the pointing area, corresponding to the pointer, to the second size when the at least one finger moves either at the lower speed than the predetermined speed or by the shorter distance than the predetermined distance.

In addition, a motion of a first finger and a second finger present in the 3D sensing area moving toward the sensing panel, that is, in the downward direction while increasing a distance between the first finger and the second finger and then moving away from the sensing panel, that is, in the upward direction, may correspond to an execution operation of enlargement of the object corresponding to the pointer. The motion may be included in the table and may be stored in the storage module 130.

In this case, the control module 120 may enlarge the object corresponding to the pointer when the first finger and the second finger in the 3D sensing area move toward the sensing panel while increasing the distance between the first finger and the second finger and then move away from the sensing panel.

In addition, a motion of the first finger and the second finger in the 3D sensing area moving toward the sensing panel, that is, in the downward direction while decreasing the distance between the first finger and the second finger and then moving away from the sensing panel, that is, in the upward direction, may correspond to an execution operation of reduction of the object corresponding to the pointer. The motion may be included in the table and may be stored in the storage module 130.

In this case, the control module 120 may reduce the object corresponding to the pointer when the first finger and the second finger move toward the sensing panel while decreasing the distance between the first finger and the second finger and then move away from the sensing panel.

In addition, a rotating motion of the first finger and the second finger in the 3D sensing area may correspond to an execution operation of rotation of the object pointed to by the pointer. The motion may be included in the table and may be stored in the storage module 130.

In this case, the control module 120 may rotate the object pointed to by the pointer when either the first finger or the second finger, or both, in the 3D sensing area rotate.

The control module 120 may calculate a curvature of the at least one finger present in the 3D sensing area. In addition, the control module 120 may detect a position and a number of a portions of the at least one finger, the portion having a greater curvature than a reference curvature.

Hereinafter, the operation of the control module 120 recognizing the portion of the at least one finger by calculating the curvature will be described with reference to FIGS. 3A and 3B.

Figure 3A:
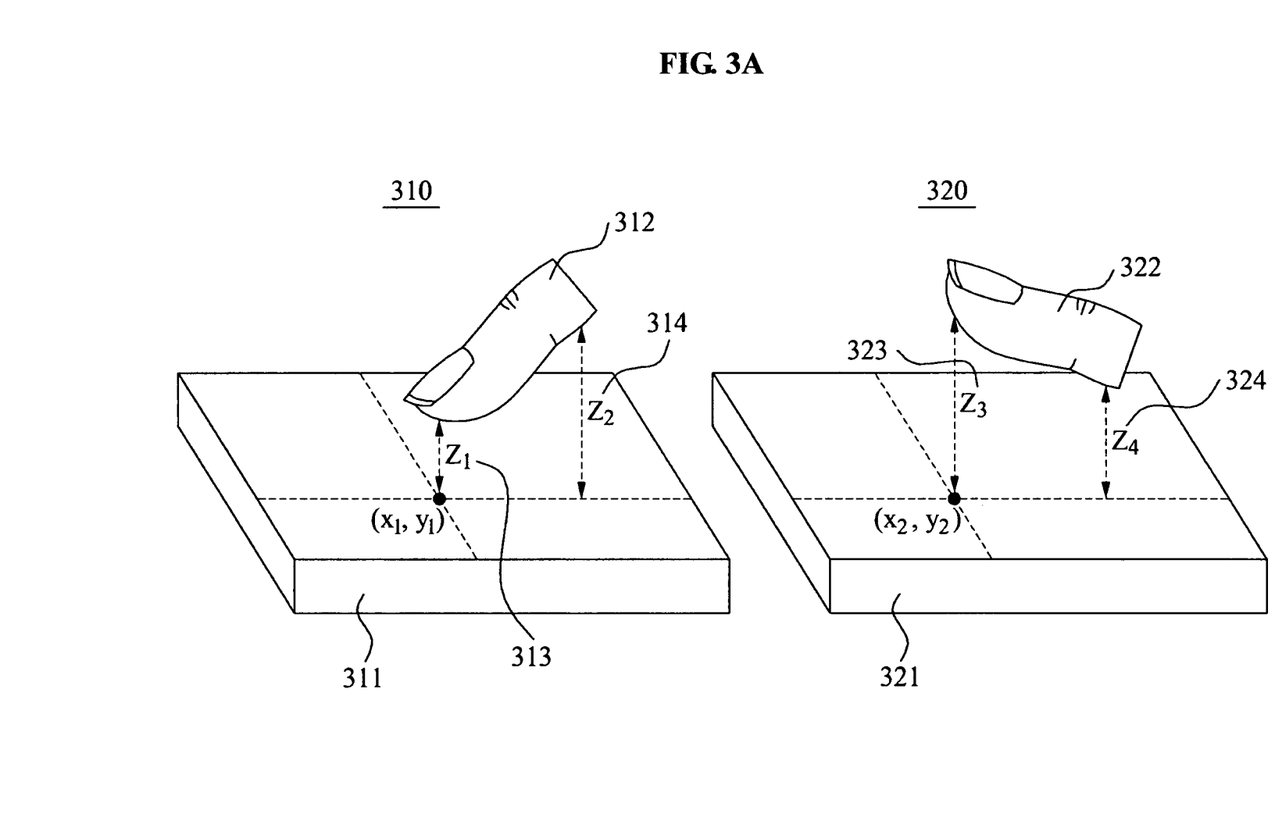
FIGS. 3A and 3B illustrate a diagram showing a control module of an object control apparatus according to example embodiments, the control module recognizing a portion of at least one finger.
Figure 3B:
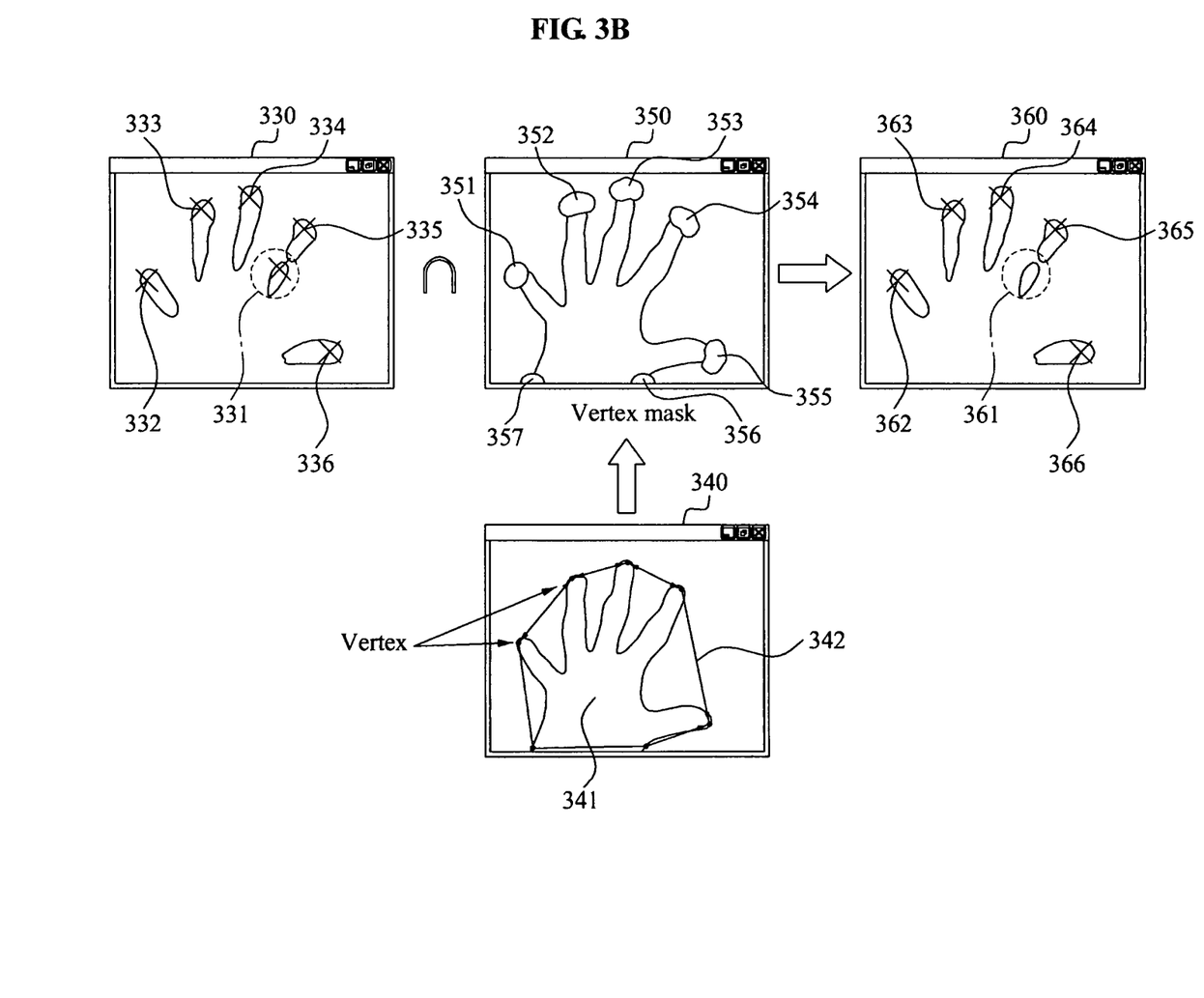

FIGS. 3A and 3B illustrate a diagram showing a control module of an object control apparatus according to example embodiments, the control module recognizing a portion of at least one finger.

Referring to FIG. 3A, a user may move fingers 312 and 322 within the 3D sensing area.

In a first state 310, a tip of the finger 312 may be disposed closest to a sensing panel 311. That is, a distance $Z_1$ 313 between the tip of the finger 312 and the sensing panel 311 may be less than a distance $Z_2$ 314 between a middle of the finger 312 and the sensing panel 311.

In a second state 320, a middle of the finger 322 may be disposed closest to a sensing panel 321. That is, a distance $Z_3$ 323 between the tip of the finger 322 and the sensing panel 321 may be greater than a distance $Z_4$ 324 between a middle of the finger 322 and the sensing panel 321.

When inputting a control signal, the user usually uses the tips of the fingers 312 and 322. Therefore, the control module of the object control apparatus may detect a position and a number of the tips of the fingers 312 and 322.

The sensing module of the object control apparatus may calculate a curvature of the fingers 312 and 322 to detect the tips of the fingers 312 and 322, and may detect a position and a number of portions having a curvature greater than a reference curvature.

In other words, the sensing module may recognize the portion having a curvature greater than the reference curvature as the tips of the fingers 312 and 322.

However, a portion having a curvature greater than the reference curvature may not be the tips of the fingers 312 and 322, which may indicate an occurrence of an error. In this case, the control module may remove the error using vertex masks to recognize only the tips of the fingers 312 and 322.

Referring to FIG. 3B, the sensing module may calculate the curvature of the at least one finger of the user, and may detect the portion having the greater curvature than the reference curvature.

An image 330 shows portions 331 to 336 where the curvature is greater than the reference curvature. Although the portion 331 is not a tip of the at least one finger of the user, the curvature of the portion 331 is greater than the reference curvature. Therefore, the portion 331 may be detected by the sensing module along with the tip of the at least one finger, thereby causing an error.

In this case, the control module may remove the error using vertex masks and may thereby detect only the tips of the fingers 312 and 322.

The sensing module may generate a polygon by connecting outermost vertices of a hand of the user. An image 340 shows a polygon 342 connecting outermost vertices of a hand 341 of the user.

A plurality of the vertices of the polygon 342 may include the vertex masks according to the example embodiments. An image 350 shows vertices 351 to 357 of the polygon 342.

After the polygon 342 is formed, the sensing module may extract an intersection between the portions 331 to 336 having greater curvatures than the reference curvature and the vertices 351 to 357 of the polygon. That is, the intersection between the image 330 including an error and the image 350 including the vertex masks may be extracted. By extracting the intersection, the sensing module may remove the error and correctly recognize only the tips of the at least one finger of the user. An image 360 shows tips 362 to 366 of the fingers of the user, from which an error 361 is removed.

Hereinafter, motions of the at least one finger to control the pointer or the object according to example embodiments, are described with reference to FIGS. 4 through 8.

Figure 4:
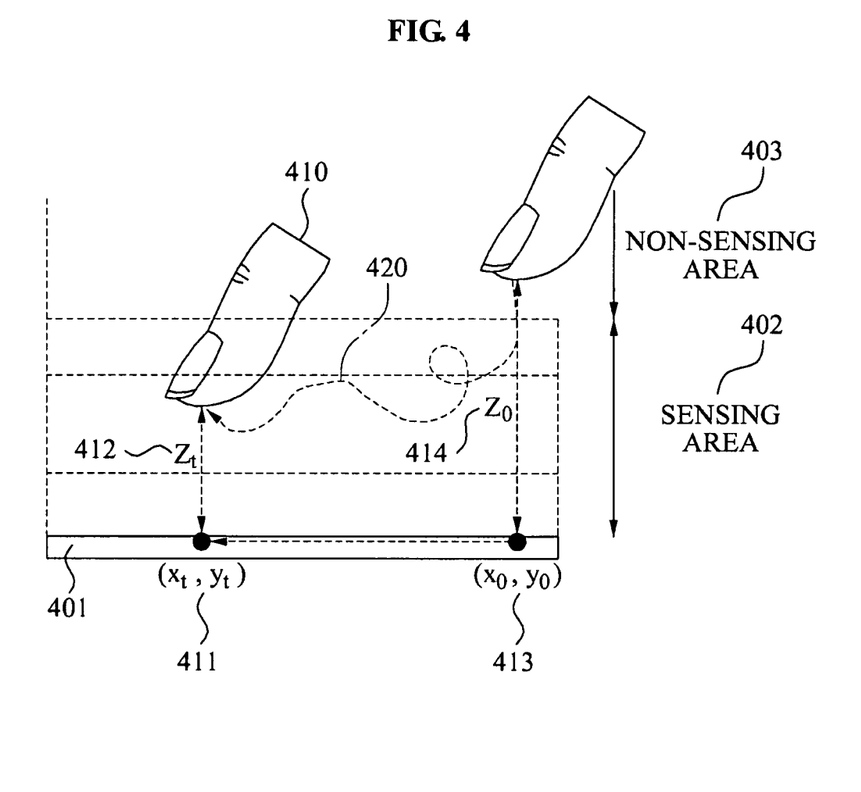
FIG. 4 illustrates a diagram showing a pointing motion or an object moving motion of at least one finger, according to example embodiments.

FIG. 4 illustrates a diagram showing a pointing motion or an object moving motion of the at least one finger, according to example embodiments.

Referring to FIG. 4, when the user moves a finger 410 within a 3D sensing area 402, an object control apparatus according to the example embodiments may use the pointing motion or the object moving motion for moving a selected object.

For example, the object control apparatus may perform the pointing motion before the user inputs an operation of selecting the object, and may perform the object moving motion after the user selects the object.

The object control apparatus may perform the pointing motion or the object moving motion corresponding to a movement locus 420 of the finger 410. Here, the object control apparatus may calculate the movement locus 420, based on a distance 414 from a sensing panel 401 to a position 413 of the finger 410 at the time of entering the 3D sensing area 402, and a distance 412 from the sensing panel 401 to a position 411 to which the finger 410 is moved in the 3D sensing area 402.

Figure 5:
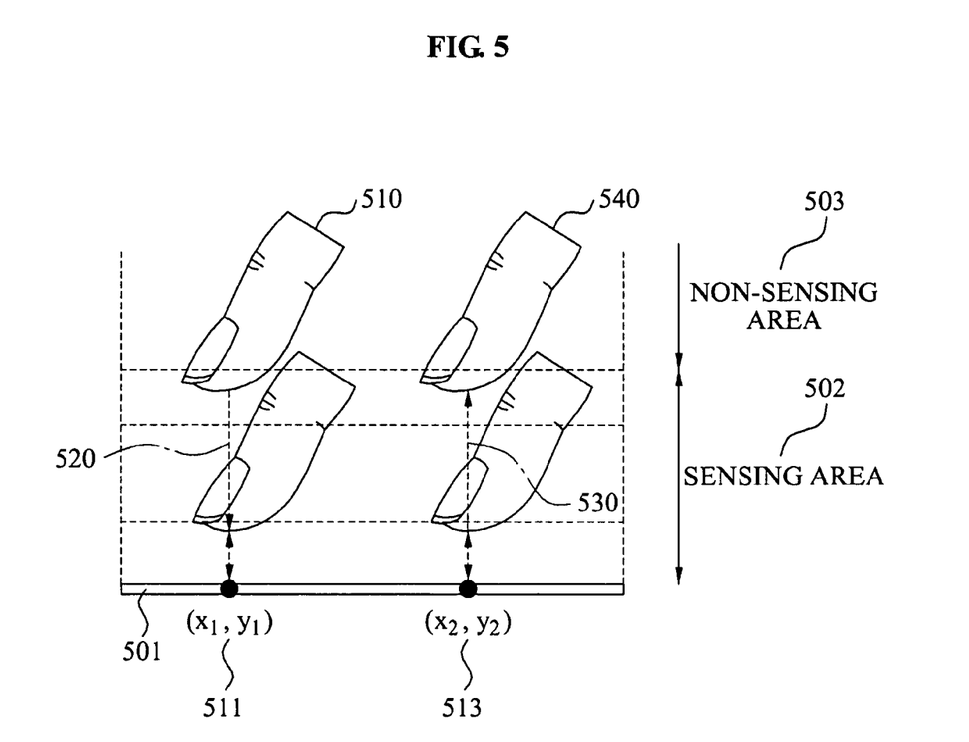
FIG. 5 illustrates a diagram showing selection and cancellation operations, and enlargement and reduction operations of an object control apparatus according to example embodiments.

FIG. 5 illustrates a diagram showing selection and cancellation operations, and enlargement and reduction operations of an object control apparatus according to example embodiments.

Referring to FIG. 5, when the user moves fingers 510 and 540 upward and downward within a 3D sensing area 502, the object control apparatus may enlarge a pointing area corresponding to the pointer, or select and cancel the selection of an object pointed to by the pointer.

When the finger 510 moves toward a sensing panel 501 within the 3D sensing area 502 at a speed higher than a predetermined speed and by a distance longer than a predetermined distance without moving in lateral directions, that is, maintaining a planar coordinate value 511, the object control apparatus may select the object pointed to by the pointer.

In addition, when the finger 510 moves toward the sensing panel 501 within the 3D sensing area 502 either at a speed lower than the predetermined speed or by a distance shorter than the predetermined distance without moving in lateral directions, that is, maintaining the planar coordinate value 511, the object control apparatus may enlarge the pointing area to a first size.

When the finger 540 moves away from the sensing panel 501 within the 3D sensing area 502 at a speed higher than the predetermined speed and by a distance longer than the predetermined distance without moving in lateral directions, that is, maintaining a planar coordinate value 513, the object control apparatus may cancel the selection of the object pointed to by the pointer.

In addition, when the finger 540 moves away from the sensing panel 501 within the 3D sensing area 502 either at a speed lower than the predetermined speed or by a distance shorter than the predetermined distance without moving in lateral directions, that is, maintaining the planar coordinate value 513, the object control apparatus may enlarge the pointing area to a second size.

Figure 6:
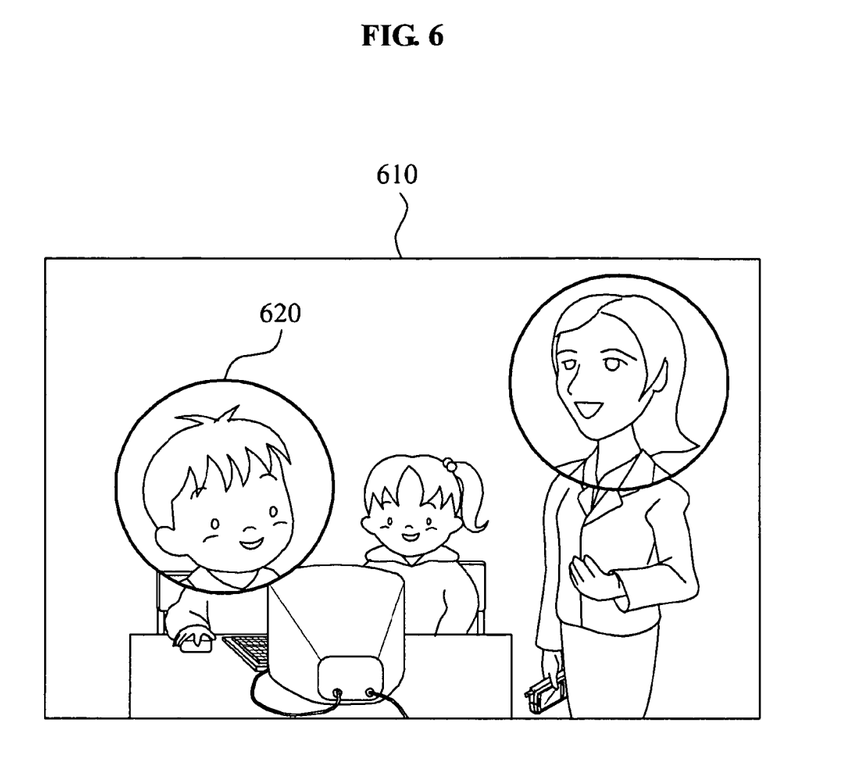
FIG. 6 illustrates a diagram of a pointing area according to example embodiments.

FIG. 6 illustrates a diagram of a pointing area 620 according to example embodiments.

Referring to FIG. 6, an image 610 shows the pointing area 620, corresponding to the pointer, enlarged by an object control apparatus according to the example embodiments.

When the user moves a finger toward the sensing panel within the 3D sensing area either by a speed lower than a predetermined speed or by a distance shorter than a predetermined distance without moving the finger in lateral directions, the object control apparatus may enlarge the pointing area 620, corresponding to the pointer, to a first size.

In addition, when the user moves the finger away from the sensing panel within the 3D sensing area by a speed lower than the predetermined speed or by a distance shorter than the predetermined distance without moving the finger in lateral directions, the object control apparatus may enlarge the pointing area 620, corresponding to the pointer, to a second size.

Depending on embodiments, the first size may be set larger than the second size.

Figure 7:
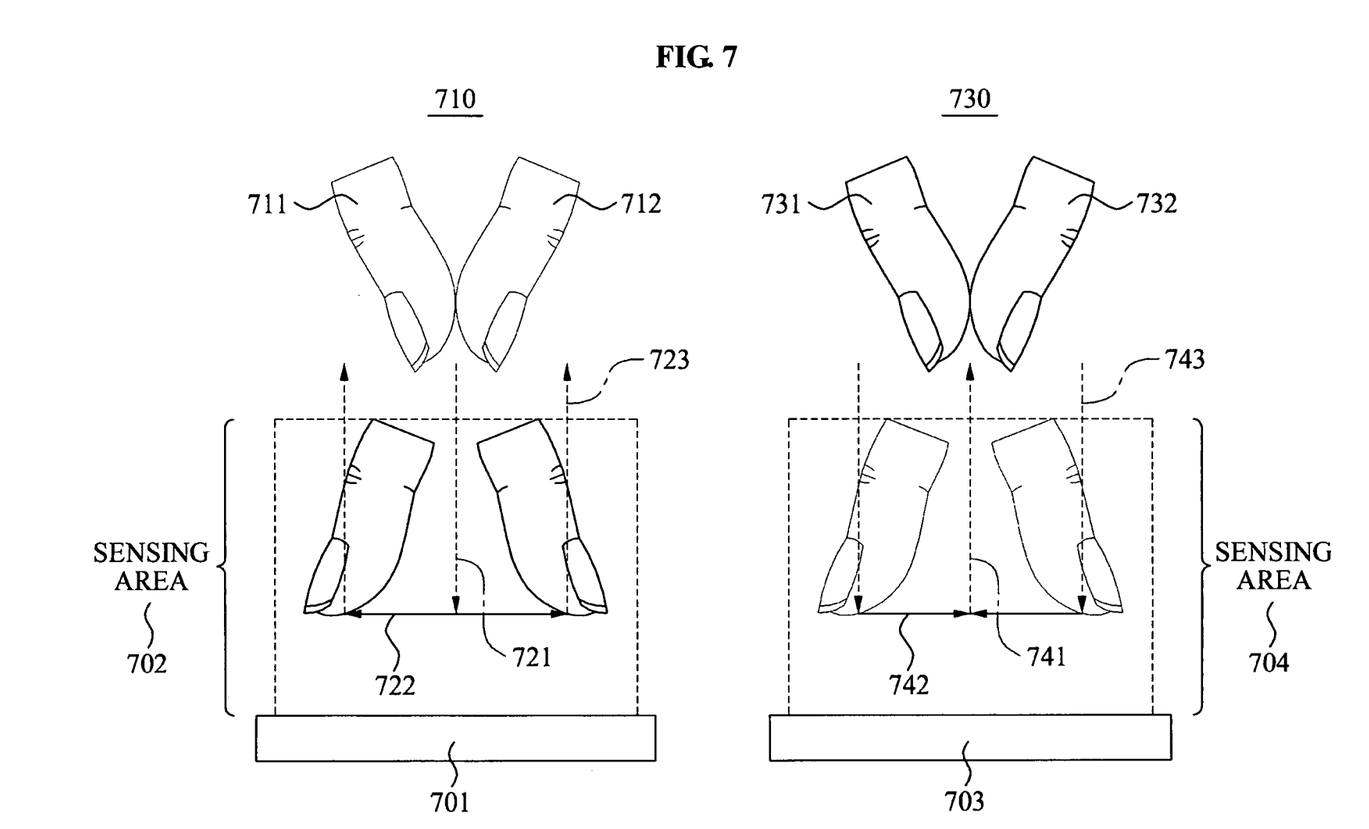
FIG. 7 illustrates a diagram showing operations of enlargement and reduction of a selected object, according to example embodiments.

FIG. 7 illustrates a diagram showing operations of enlargement and reduction of a selected object, according to example embodiments.

Referring to FIG. 7, an object control apparatus according to the example embodiments may enlarge the object pointed to by the pointer, when the user performs a motion 721 of moving a first finger (for example, a thumb) 711 and a second finger (for example, an index finger) 712 toward a sensing panel 701 within a 3D sensing area while performing a motion 722 of increasing a distance between the first finger 711 and the second finger 712, and then performs a motion 723 of moving the first finger 711 and the second finger 712 away from the sensing panel 701. In other words, when the user moves the first finger 711 and the second finger 712 downward while separating the first finger 711 and the second finger 712 and then moves the first finger 711 and the second finger 712 upward, the object control apparatus may enlarge the object pointed to by the pointer.

In addition, when the user performs a motion 743 of moving a first finger 731 and a second finger 732 toward a sensing panel 703 within a 3D sensing area 704 while performing a motion 742 of decreasing a distance between the first finger 731 and the second finger 732, and then performs a motion 741 of moving the first finger 731 and the second finger 732 away from the sensing panel 703, the object control apparatus may reduce the object pointed to by the pointer. In other words, when the user moves the first finger 731 and the second finger 732 downward while closing the first finger 731 and the second finger 732 and then moves the first finger 731 and the second finger 732 upward, the object control apparatus may reduce the object.

The object control apparatus may enlarge and reduce the selected object by different degrees according to the distance from the finger and the sensing panel.

Depending on embodiments, although the separated distance and the downward moving distance of the two fingers 711 and 712 are the same, a degree of enlargement of the object may be varied according to a distance between the fingers 711 and 712 and the sensing panel 701. For example, more specifically, the degree of enlargement of the selected object may be greater when the fingers 711 and 712 move downward from about 3 cm to about 2 cm above the sensing panel 710, than when the fingers 711 and 712 move downward from about 2 cm to about 1 cm above the sensing panel 710. Even when the moved distances of the fingers 711 and 712 are equal, the enlarged degree of the object may be greater when the distance between the fingers 711 and 712 and the sensing panel 701 is longer.

By contrast, in an alternative embodiment, the enlarged degree of the object may be greater when the distance between the fingers 711 and 712 and the sensing panel 701 is shorter.

Figure 8:
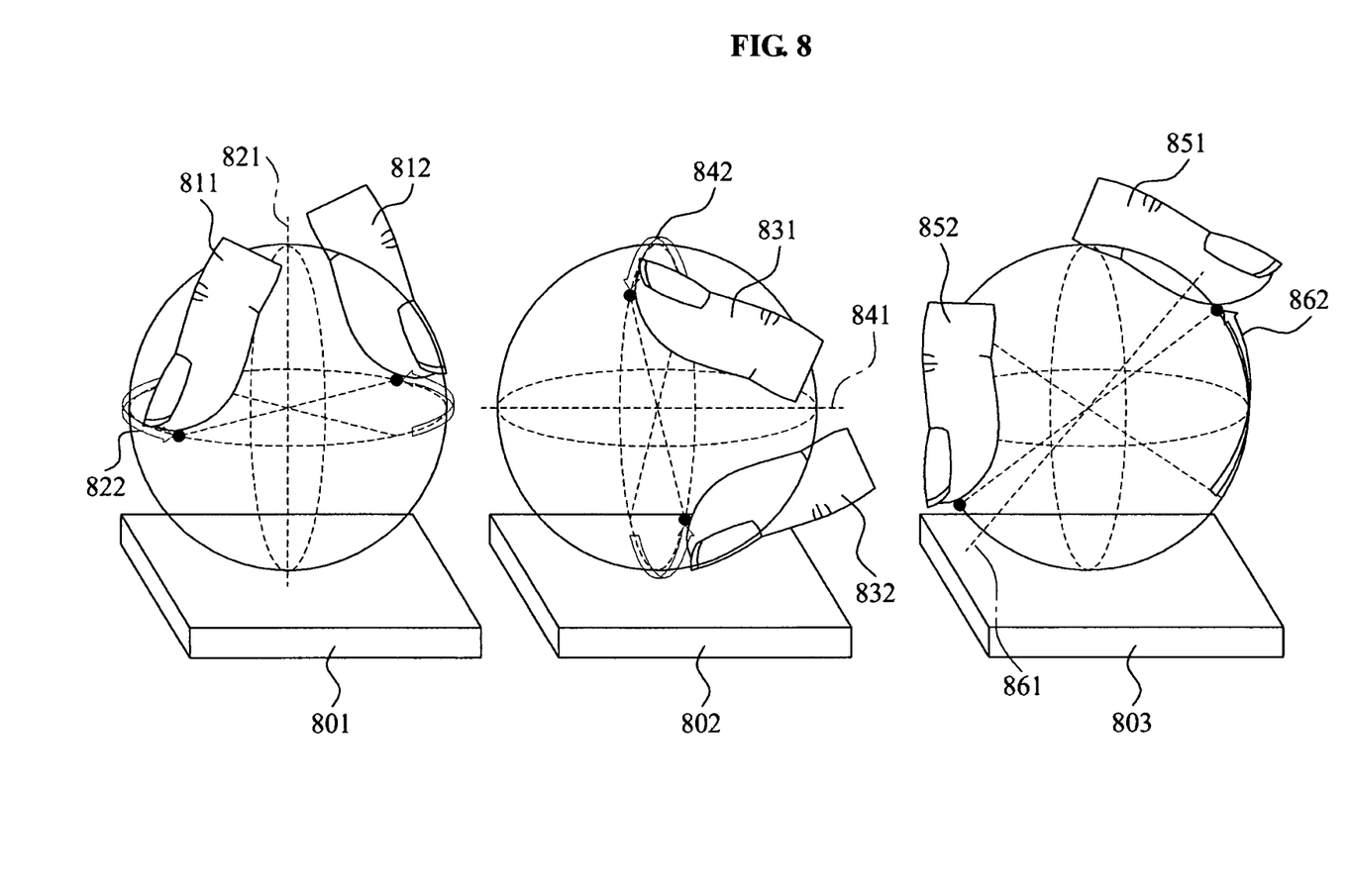
FIG. 8 illustrates a diagram showing an operation of rotation of an object, according to example embodiments.

FIG. 8 illustrates a diagram showing an operation of rotation of an object, according to example embodiments.

Referring to FIG. 8, an object control apparatus according to the example embodiments may rotate the object pointed to by the pointer when the user rotates a first finger and a second finger within the 3D sensing area.

Depending on embodiments, the user may rotate a first finger 811 and a second finger 812 clockwise 822 about a z-axis 821, as a rotational axis on the 3D coordinate of FIG. 2 corresponding to a sensing panel 801. Here, the object control apparatus may rotate the object pointed to by the pointer, clockwise 822 about the z-axis 821.

Depending on embodiments, the user may rotate a first finger 831 and a second finger 832 counterclockwise 842 about an x-axis 841, as a rotational axis on the 3D coordinate of FIG. 2 corresponding to a sensing panel 802. Here, the object control apparatus may rotate the object pointed to by the pointer counterclockwise 842, about the x-axis 841.

Depending on embodiments, the user may rotate a first finger 851 and a second finger 852 counterclockwise 842 about a y-axis 861, as a rotational axis on the 3D coordinate of FIG. 2 corresponding to a sensing panel 803. Here, the object control apparatus may rotate the object pointed to by the pointer counterclockwise 842, about the y-axis 861.

Figure 9:
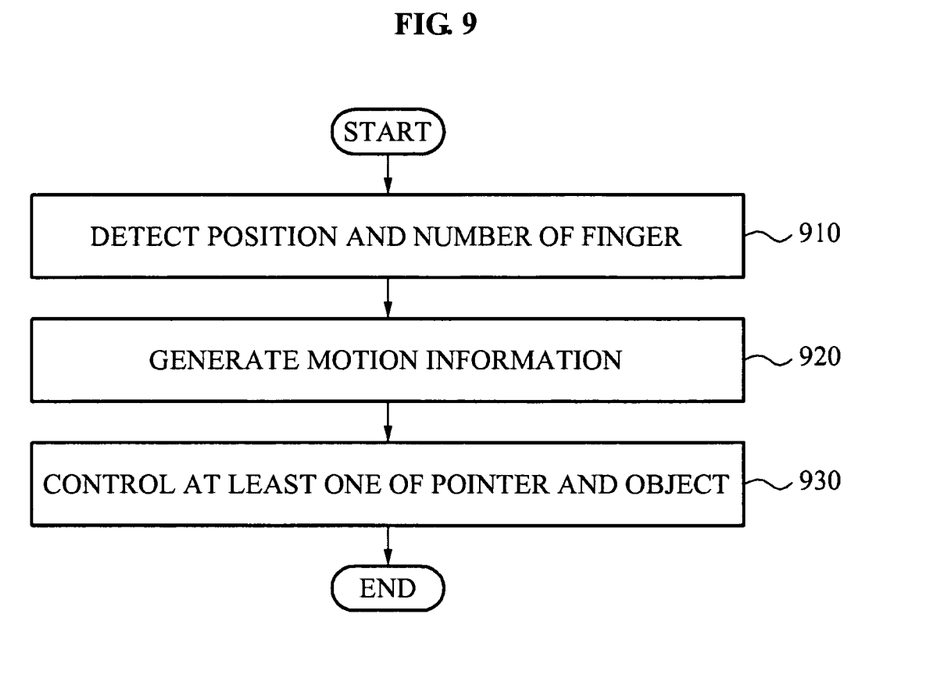
FIG. 9 illustrates a flowchart of an object control method according to example embodiments.

FIG. 9 illustrates a flowchart of an object control method according to example embodiments.

Referring to FIG. 9, the object control method may detect a position and a number of at least one finger of a user, the at least one finger present in a 3D sensing area, in operation 910.

The 3D sensing area lies around a sensor or a sensing module capable of detecting the position and the number of the at least one finger of the user. The 3D sensing area has a predetermined size.

The object control method may detect the position and the number of the at least one finger using an ultrasonic sensor, a capacitive touch sensor, an image sensor, and the like.

Information on the position of the at least one finger may include a distance between the sensing panel and the at least one finger, and a planar coordinate value of the at least one finger on the sensing panel.

In operation 920, the object control method may generate motion information on motions of the at least one finger, based on the position and the number of the at least one finger.

Here, the motions may include a motion of a finger moving up and down in the 3D sensing area, a motion of two fingers moving downward while being separated from each other, a motion of two fingers moving upward while being moved closer together, a motion of two fingers rotating clockwise or counterclockwise at a predetermined interval from each other with respect to a predetermined rotational axis, and the like.

In addition, the object control method may control at least one of the pointer and the object, based on the motion information, in operation 930.

The object control method may process execution operations corresponding to the motion information, by referring to a table that contains the motions of the at least one finger, and the execution operations corresponding to the motions, the execution operations related to at least one of the pointer and the object.

For example, in the table, a motion of the at least one finger moving toward the sensing panel, that is, in the downward direction, at a speed higher than a predetermined speed and by a distance longer than a predetermined distance may correspond to an execution operation of selecting the object pointed to by the pointer.

Here, the object control method may select the object pointed to by the pointer when the at least one finger moves toward the sensing panel at the speed higher than the predetermined speed and by the distance longer than the predetermined distance.

Also, in the table, a motion of the at least one finger moving away from the sensing panel, that is, in the upward direction, at a speed higher than the predetermined speed and by a distance longer than the predetermined distance may correspond to an execution operation of cancelling the selection of the object pointed to by the pointer.

Here, the object control method may cancel the selection of the object when the at least one finger moves away from the sensing panel at the speed higher than the predetermined speed and by the distance longer than the predetermined distance.

Also, in the table, a motion of the at least one finger moving toward the sensing panel, that is, in the downward direction, either at a speed lower than the predetermined speed or by a distance shorter than the predetermined distance may correspond to an execution operation of enlargement, to a first size, a pointing area corresponding to the pointer.

In this case, the object control method may enlarge the pointing area corresponding to the pointer to the first size when the at least one finger moves either at the speed lower than the predetermined speed or by the distance shorter than the predetermined distance.

Also, in the table, a motion of the at least one finger moving away from the sensing panel, that is, in the upward direction, either at a speed lower than the predetermined speed or by a distance shorter than the predetermined distance, may correspond to an execution operation of enlargement, to a second size, the pointing area corresponding to the pointer. Depending on embodiments, the second size may be set smaller than the first size.

In this case, the object control method may enlarge the pointing area corresponding to the pointer to the second size when the at least one finger moves either at the speed lower than the predetermined speed or by the distance shorter than the predetermined distance.

In addition, in the table, a motion of a first finger and a second finger present in the 3D sensing area moving toward the sensing panel, that is, in the downward direction while increasing a distance between the first finger and the second finger and then moving away from the sensing panel, that is, in the upward direction may correspond to an execution operation of enlargement of the object corresponding to the pointer.

In this case, the object control method may enlarge the object corresponding to the pointer when the first finger and the second finger in the 3D sensing area move toward the sensing panel while increasing the distance between the first finger and the second finger and then move away from the sensing panel.

In addition, in the table, a motion of the first finger and the second finger in the 3D sensing area moving toward the sensing panel, that is, in the downward direction while decreasing the distance between the first finger and the second finger and then moving away from the sensing panel, that is, in the upward direction may correspond to an execution operation of reduction the object corresponding to the pointer.

In this case, the object control method may reduce the object corresponding to the pointer when the first finger and the second finger move toward the sensing panel while decreasing the distance between the first finger and the second finger and then move away from the sensing panel.

In the table, a rotating motion of the first finger and the second finger in the 3D sensing area may correspond to an execution operation of rotation of the object pointed to by the pointer.

Here, the object control method may rotate the object pointed to by the pointer when the first finger and the second finger in the 3D sensing area rotate.

When detecting the position and the number of the at least one finger according to the object control method, a curvature of the at least one finger may be calculated. Also, the detection procedure may detect a position and a number of a portion of the at least one finger, the portion having a greater curvature than a reference curvature.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the apparatus for controlling an object described herein.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A method of controlling an object, the method comprising:
    detecting a position of at least one finger of a user, the at least one finger present in a 3-dimensional (3D) sensing area, and a number of the at least one finger present in the 3D sensing area, the 3D sensing area comprising a volume up to a predetermined height above a sensing panel of the sensing module, wherein the sensing panel comprises upper electrodes and lower electrodes to detect the position and the number of the at least one finger present in the 3D sensing area;
    generating motion information regarding motions of the at least one finger based on the position and the number of the at least one finger; and
    controlling at least one of a pointer and an object being displayed based on the motion information,
    wherein the upper electrodes and the lower electrodes are arranged in a form of a grid,
    wherein the detecting of the position and the number of the at least one finger comprises:
    calculating curvatures of a plurality of portions included in the at least one finger in the 3D sensing area, wherein at least two portions of the plurality of portions correspond to different joints of the same finger;
    detecting a position and a number of at least one portion, from among the plurality of portions, having a curvature greater than a reference curvature;
    extracting at least one intersection between the at least one portion and vertices of a polygon connecting outermost vertices of a hand of the user; and
    determining at least one finger tip of the user based on the at least one intersection.

2. The method of claim 1, wherein the detecting of the position and the number of the at least one finger comprises: processing execution operations corresponding to the motion information by referring to a table that contains the motions and the execution operations corresponding to the motions, the execution operations being related to at least one of the pointer and the object.

3. A non-transitory computer readable recording medium storing a program to cause a computer to implement the method of claim 1.

4. The method of claim 1, wherein the detecting of the position and the number of the at least one finger comprises detecting the position and the number of the at least one finger present in the 3D sensing area through variation of a current intensity of an electric field generated between the upper electrodes and the lower electrodes.

5. The method of claim 1, wherein the controlling of the at least one of the pointer and the object comprises rotating the object pointed to by the pointer when at least one of a first finger and a second finger in the 3D sensing area is detected as rotating.

6. A device having a display with a display surface, the device comprising:
    a sensing module to calculate curvatures of at least one finger present in a 3-dimensional (3D) sensing area occupying a predetermined volume above the display surface, to detect a portion of the at least one finger, the portion having a greater curvature than a reference curvature, to extract at least one intersection between the portion and vertices of a polygon connecting outermost vertices of a hand of the user, and to determine at least one finger tip of the user based on the at least one intersection; and
    a control module to control an object displayed on the display based on the detected portion having the greater curvature than the reference curvature.

7. The device of claim 6, wherein the sensing module comprises a sensing panel having upper electrodes and lower electrodes that detect motion of at the least one finger present in the 3D sensing area through variation of a current intensity of an electric field generated between the upper electrodes and the lower electrodes.

8. The device of claim 6, wherein the control module controls the displayed object to rotate when the at least one of finger in the 3D sensing area is detected as rotating.

9. The device of claim 6, wherein the display further displays a pointer pointing to the object and wherein the control module selects an object pointed to by the pointer when the at least one finger is detected as moving toward the sensing panel by a longer distance than a predetermined distance and at a higher speed than a predetermined speed.

10. The device of claim 6, wherein the reference curvature is less than a curvature of each finger tip of a user.

* * * * *